Figure 1:
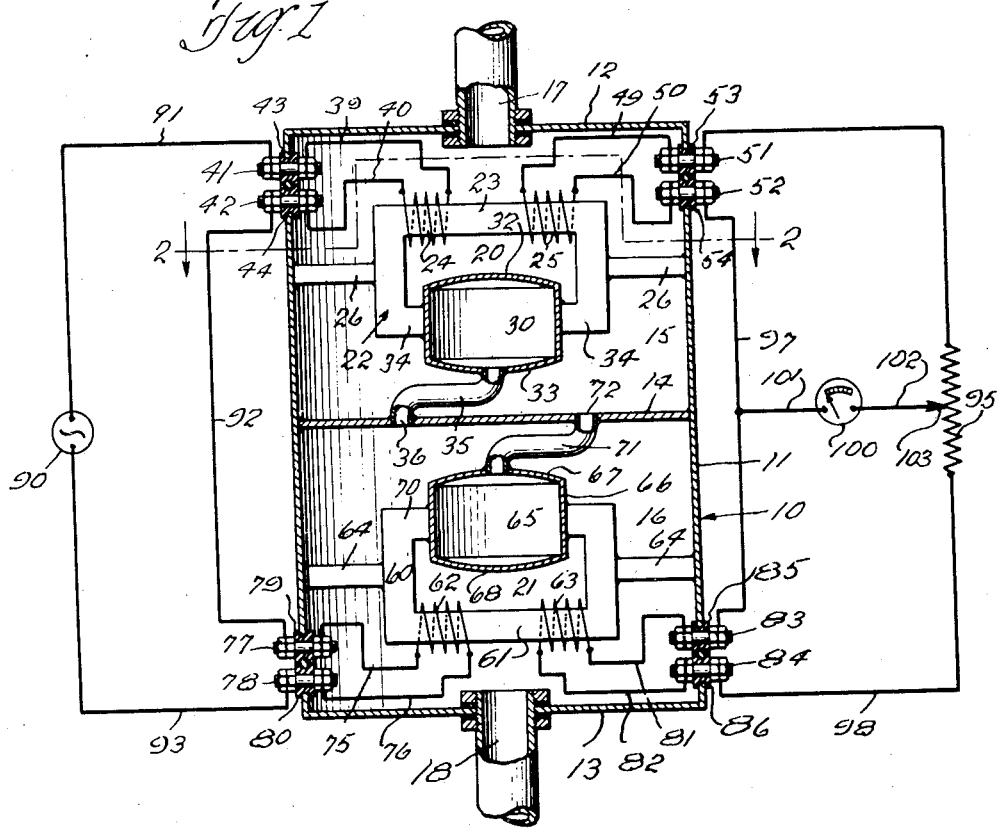

Jan. 25, 1949.　　　　J. F. EMERSON　　　　2,460,076
ELECTROMAGNETIC PRESSURE GAUGE
Filed Feb. 24, 1947

INVENTOR
John F. Emerson
BY
ATTORNEY

Patented Jan. 25, 1949

2,460,076

UNITED STATES PATENT OFFICE 2,460,076

ELECTROMAGNETIC PRESSURE GAUGE

John F. Emerson, Hasbrouck Heights, N. J., assignor to Kearfott Company, Inc., New York, N. Y., a corporation of New York Application February 24, 1947, Serial No. 730,484

4 Claims. (Cl. 73—398)

1

This invention relates to electromagnetic pressure gauges and has for an object to provide a gauge of the above type having novel and improved details of construction and features of operation.

Another object of the invention is to provide an electromagnetic pressure gauge which utilizes the pressure sensitivity of certain magnetic materials for measuring fluid pressures.

Another object is to provide a pressure gauge of the above type in which the direction of maximum stress of the magnetic material coincides with the direction of the flux path.

Another object is to provide a novel and improved device of the above type which is insensitive to mechanical vibration.

Other objects and advantages will be apparent as the nature of the invention is more fully disclosed.

In accordance with the present invention a transformer is formed with a closed core which includes as one element a hollow cylindrical casing or container to which fluid pressure may be applied. The container is so arranged that the fluid pressure stresses the walls thereof in the direction of flux flow and thereby varies the reluctance of the magnetic circuit. For increasing the sensitivity of the device the containers are made of a magnetic material the permeability of which changes in opposite sense when subjected to compression than when subjected to tension and a pair of containers are arranged to be differentially stressed by the applied pressure so that one container is placed under compression and the other under tension. The effects are thus made additive.

In one embodiment the containers are disposed in a closed chamber which is arranged so that different fluid pressures may be applied to the inside and outside of the containers. The walls of the containers are thus stressed by the pressure to be measured and the resultant changes in permeability may be utilized as an indication of this pressure.

Although the novel features which are believed to be characteristic of this invention are pointed out more particularly in the claims, the nature of the invention will be better understood by referring to the following description, taken in connection with the accompanying drawing in which a specific embodiment thereof has been set forth for purposes of illustration.

Figure 2:
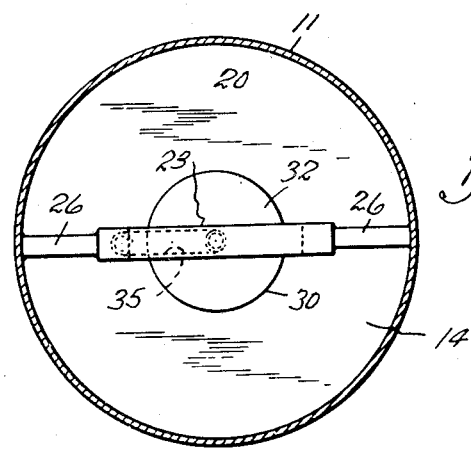

In the drawings:

Fig. 1 is a longitudinal section through a pressure sensitive device embodying the present invention, with the electric circuits indicated schematically; and Fig. 2 is a transverse section through the device taken on the line 2—2 of Fig. 1.

Referring to the drawings more in detail, the device is shown as comprising a closed vessel 10 having a cylindrical wall 11 and end walls 12 and 13. A central transverse partition 14 divides the vessel 10 into two compartments 15 and 16. Pipes 17 and 18 extend through the end walls 12 and 13 respectively to supply fluids, the differential pressure of which is to be measured, to the respective compartments 15 and 16. If the pressure difference between two fluids is to be measured the respective fluids are applied to the pipes 17 and 18. If, however, the pressure of a single fluid only is to be measured, such fluid may be supplied to one of the pipes 17 or 18 and the other of the pipes may remain open to the atmosphere or may be sealed to maintain a constant pressure in the corresponding compartment. Transformers 20 and 21 are mounted in the respective compartments 15 and 16. The transformer 20 comprises a closed magnetic core 22, having a leg 23 carrying a primary winding 24 and a secondary winding 25. The core 22 is shown as supported by struts 26 attached to the side wall 11. A closed cylinder 30 is inserted in the return leg 34 of the core 22. This cylinder 30 includes a cylindrical side wall 31 and the walls 32 and 33 which are bowed outwardly so as to be under compression in response to outside pressures and under tension in response to inside pressures. The return leg 34 is attached to the side wall 31 at diametrically opposite points so that the magnetic path extends circumferentially around the cylinder. A pipe 35 connects the interior of the cylinder 30 to a port 36 in the partition 14, so that the interior of the cylinder 30 is maintained at the pressure of the compartment 16.

The primary winding 24 is connected by leads 39 and 40 to terminal posts 41 and 42 which extend through the cylindrical wall 11 and are insulated therefrom by suitable means, shown as bushings 43 and 44. The secondary winding 25 is connected by leads 49 and 50 to terminal posts 51 and 52 which also extend through the wall 11 and are insulated therefrom by means shown as bushings 53 and 54.

The transformer 21 comprises a magnetic core 60 having a leg 61 carrying a primary winding 62 and a secondary winding 63. The core 61 is shown as supported by struts 64 attached to the side wall 11. The return leg 70 of the core includes a closed cylinder 65 having a cylindrical side wall 66 and end walls 67 and 68 which are bowed outwardly similarly to the end walls 32 and 33 of the cylinder 30. The return leg 70 of the core 60 is attached to the side wall 66 at diametrically opposite points so that the magnetic path extends circumferentially around the cylinder. A pipe 71 connects the interior of the cylinder 65 to a port 72 in the partition 14, so that the interior of the cylinder 65 is maintained at the pressure of the compartment 15.

The primary 62 is connected by leads 75 and 76 to terminal posts 77 and 78 which extend through the cylindrical wall 11 and are insulated therefrom by bushings 79 and 80 respectively. The secondary 63 is connected by leads 81 and 82 to terminal posts 83 and 84 which extend through the cylindrical side wall 11 and are insulated therefrom by bushings 85 and 86 respectively.

The primaries 24 and 62 are connected in series to a suitable source of alternating current 90 by leads 91, 92 and 93 which are connected to the terminal posts 41, 42, 77 and 78.

The secondary windings 25 and 63 are series connected to a potentiometer 95 by leads 96, 97 and 98 which are connected to terminal posts 51, 52, 83 and 84. A voltage indicating instrument such as a voltmeter 100 is connected in a bridge circuit by leads 101 and 102 between the lead 97 which connects the terminal posts 52 and 83 and a variable tap 103 on the potentiometer 95.

In the operation of this device, a fluid whose pressure is to be measured is supplied through the pipe 18 to the compartment 16 and through the pipe 35 to the interior of the cylinder 30. The pipe 17 remains open to the atmosphere or the compartment 15 may be sealed at a fixed pressure which is also supplied through the pipe 71 to the interior of the cylinder 65. If the difference between two fluid pressures is to be measured, one fluid is supplied by the pipe 18 to the compartment 16 and the other fluid is supplied by the pipe 17 to the compartment 15.

With the compartments 15 and 16 subjected to the same pressures, for example atmospheric, the transformers 20 and 21 are designed to have equal permeabilities so that equal voltages are induced in the secondaries 25 and 63 and, if the bridge circuit is properly balanced, a zero indication is obtained on the voltmeter 100. The tap 103 may be suitably adjusted to effect such balanced condition when both compartments are at atmospheric pressure.

When the pressures to be measured are supplied to the compartments 15 and 16 so as to establish a pressure differential therebetween, one of the cylinders 30, 65 will be subjected to external pressure which places the walls thereof under compression and the other cylinder will be subjected to internal pressure which places its walls under tension. The walls of the cylinders 30 and 65 are formed of a material such as a molybdenum-nickel-iron alloy which has the property of increasing its permeability under tension and decreasing its permeability under compression, or vice versa. Hence the permeability of the walls of one of the cylinders 30, 65 is increased and that of the other cylinder is decreased, with the result that the voltage produced by one of the secondaries 25, 63 is increased and other decreased. The balance of the bridge circuit is accordingly upset and a voltage is produced across the voltmeter 100 which is a function of the pressure difference between the applied fluids. The voltmeter 100 may of course be graduated to read directly in pressure units instead of in voltage and may constitute a direct reading pressure indicating device.

It will be noted that the side walls 31 and 66 of the cylinders 30 and 65 are stressed circumferentially by either the compressive or expansive forces to which they are subjected. Likewise, the flux in the return paths of the respective transformers flows circumferentially around the walls 31 and 66. Hence the direction of stress coincides with the direction of the flux flow and the maximum change in flux is produced by the variations in the stress to which the respective walls are subjected.

It is to be understood that the meter 100 may be replaced by a follow-up device which is adapted to drive the variable tap 103 to a position such that a zero voltage is obtained across the instrument 100, or the tap 103 may be adjusted manually so as to obtain a zero voltage. In either case the pressure differential will be measured by the displacement of the tap 103, and a suitable scale may be incorporated with the potentiometer 95 for this purpose.

The secondaries 25 and 63 may of course be connected in opposition to the voltmeter 100 so as to indicate directly the unbalance in voltages in the two secondaries, or the windings may be connected in series opposition and the voltage from the follow-up potentiometer connected to cancel the differential voltage.

Inasmuch as the two transformers 20 and 21 are mounted in a parallel position in the side wall 11 of the casing 10 they will be equally affected by mechanical disturbances, such as the vibration of the support on which the device may be mounted, and the effect thereof on the respective cores will be balanced out. Hence the device is comparatively insensitive to mechanical vibrations and constitutes an accurate pressure gauge for measuring fluid pressures.

The device may also be used to measure mechanical pressures which may be applied to stress the respective cylinders, although it is particularly adapted to the measurement of fluid pressures and has been so described.

Although a specific application of the invention has been shown for purposes of illustration, it is to be understood that the invention may be applied to various uses and that changes and adaptations may be made therein as will be readily apparent to a person skilled in the art. The invention is only to be limited in accordance with the scope of the following claims.

What is claimed is:

1. An electromagnetic pressure gauge for measuring fluid pressures, comprising a closed container having a cylindrical wall of a magnetic material the permeability of which varies as a function of the mechanical stress to which it is subjected, magnetic members attached to said wall at diametrically opposite points and with said walls forming a closed core in which the flux passes circumferentially around said walls, primary and secondary windings carried by said magnetic members, means supplying the fluid pressure to be measured to said container to stress the walls thereof and thereby vary the reluctance of said core, a current source connected to energize said primary winding and a voltage responsive device connected to said secondary winding.

2. An electromagnetic pressure gauge for measuring fluid pressures, comprising a closed casing having an internal partition dividing said casing nto a pair of pressure compartments, means introducing fluid pressures to be measured into the respective compartments, a variable impedance device mounted in each compartment, each of said devices comprising a closed container having a cylindrical wall of a magnetic material the permeability of which varies as a function of the mechanical stress to which it is subjected, magnetic members attached to said wall at diametrically opposite points and with said walls forming a closed core and a winding carried by said magnetic members, means connecting the interior of each container to receive fluid pressure from the opposite compartment whereby the walls of each container are stressed by the differential effect of said fluid pressures, and means comparing the impedances of said devices.

3. An electromagnetic pressure gauge for measuring fluid pressures, comprising a closed casing having an internal partition dividing said casing into a pair of pressure compartments, means introducing fluid pressures to be measured into the respective compartments, a variable impedance device mounted in each compartment, each of said devices comprising a closed container having a cylindrical wall of a magnetic material the permeability of which varies as a function of the mechanical stress to which it is subjected, magnetic members attached to said wall at diametrically opposite points and with said walls forming a closed core and a winding carried by said magnetic members, means connecting the interior of each container to receive the fluid pressure from the opposite compartment whereby the walls of each container are stressed by the differential effect of said fluid pressures, a bridge circuit connected to said windings, and a voltage responsive device connected in said bridge circuit to show zero voltage when the impedances of said windings are equal and to show a voltage which is a function of the unbalance produced by differential pressures in said compartments.

4. An electromagnetic pressure gauge for measuring fluid pressures, comprising a closed casing having an internal partition dividing said casing into a pair of pressure compartments, means introducing fluid pressures to be measured into the respective compartments, a transformer mounted in each compartment, each of said transformers comprising a closed container having a cylindrical wall of a magnetic material the permeability of which varies as a function of the mechanical stress to which it is subjected, magnetic members attached to said wall at diametrically opposite points and with said walls forming a closed core and primary and secondary windings carried by said magnetic members, means connecting the interior of each container to receive fluid pressure from the opposite compartment whereby the walls of each container are stressed by the differential effect of said fluid pressures, a current source connected to energize said primaries, a bridge circuit connected to said secondaries, and a voltage responsive device connected in said bridge circuit to indicate the unbalance between the secondary voltages due to the differential pressures.

JOHN F. EMERSON.

REFERENCES CITED

The following references are of record in the file of this patent:

UNITED STATES PATENTS

| Number | Name | Date |
| --- | --- | --- |
| 2,269,760 | Eldredge | Jan. 13, 1942 |
| 2,376,156 | Kuehni | May 15, 1945 |

FOREIGN PATENTS

| Number | Country | Date |
| --- | --- | --- |
| 311,436 | Germany | Apr. 25, 1918 |
| 832,891 | France | Oct. 4, 1938 |